US009636770B2

United States Patent
Schwarze et al.

(10) Patent No.: US 9,636,770 B2
(45) Date of Patent: May 2, 2017

(54) METHOD AND DEVICE FOR CONTROLLING AN IRRADIATION SYSTEM

(71) Applicant: SLM Solutions Group AG, Luebeck (DE)

(72) Inventors: Dieter Schwarze, Luebeck (DE); Henner Schoeneborn, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 351 days.

(21) Appl. No.: 14/555,136

(22) Filed: Nov. 26, 2014

(65) Prior Publication Data

US 2015/0158111 A1    Jun. 11, 2015

(30) Foreign Application Priority Data

Nov. 27, 2013   (EP) .................................... 13194599

(51) Int. Cl.
*B22F 3/10*   (2006.01)
*B22F 3/105*  (2006.01)
(Continued)

(52) U.S. Cl.
CPC .......... *B23K 15/004* (2013.01); *B22F 3/1055* (2013.01); *B23K 15/00* (2013.01);
(Continued)

(58) Field of Classification Search
CPC . B22F 3/10; B22F 3/105; B23K 26/34; B23K 26/342; B29C 67/00; B29C 67/0051
(Continued)

(56) References Cited

U.S. PATENT DOCUMENTS

| 5,304,329 A | 4/1994 | Dickens, Jr. et al. |
| 2003/0121574 A1* | 7/2003 | Brenner ............... B23K 10/027 148/565 |

(Continued)

FOREIGN PATENT DOCUMENTS

| EP | 1568472 | 4/2007 |
| EP | 1793979 | 4/2014 |

(Continued)

OTHER PUBLICATIONS

European Patent Office, Extended European Search Report, Jul. 23, 2014, 7 pages.

*Primary Examiner* — Samuel H Heinrich
(74) *Attorney, Agent, or Firm* — Taft Stettinius & Hollister LLP

(57) ABSTRACT

In a method for controlling an irradiation system (20) for use in an apparatus (10) for producing a three-dimensional work piece and comprising a first and a second irradiation unit (22a, 22b) a first irradiation area (18a) is defined on a surface of a carrier (16) adapted to receive a layer of raw material powder. A layer of raw material powder applied onto the carrier (16) in the first irradiation area (18a) is irradiated by the first irradiation unit (22a) of the irradiation system (20), wherein the operation of the first irradiation unit (22a) is controlled in such a manner that the raw material powder is pre-heated. Thereafter the layer of raw material powder applied onto the carrier (16) in the first irradiation area (18a) is irradiated by means of the second irradiation unit (22b) of the irradiation system (20), wherein the operation of the second irradiation unit (22b) is controlled in such a manner that the raw material powder is heated to a temperature which allows sintering and/or melting of the raw material powder in order to generate a layer of the three-dimensional work piece.

15 Claims, 2 Drawing Sheets

Figure 1:
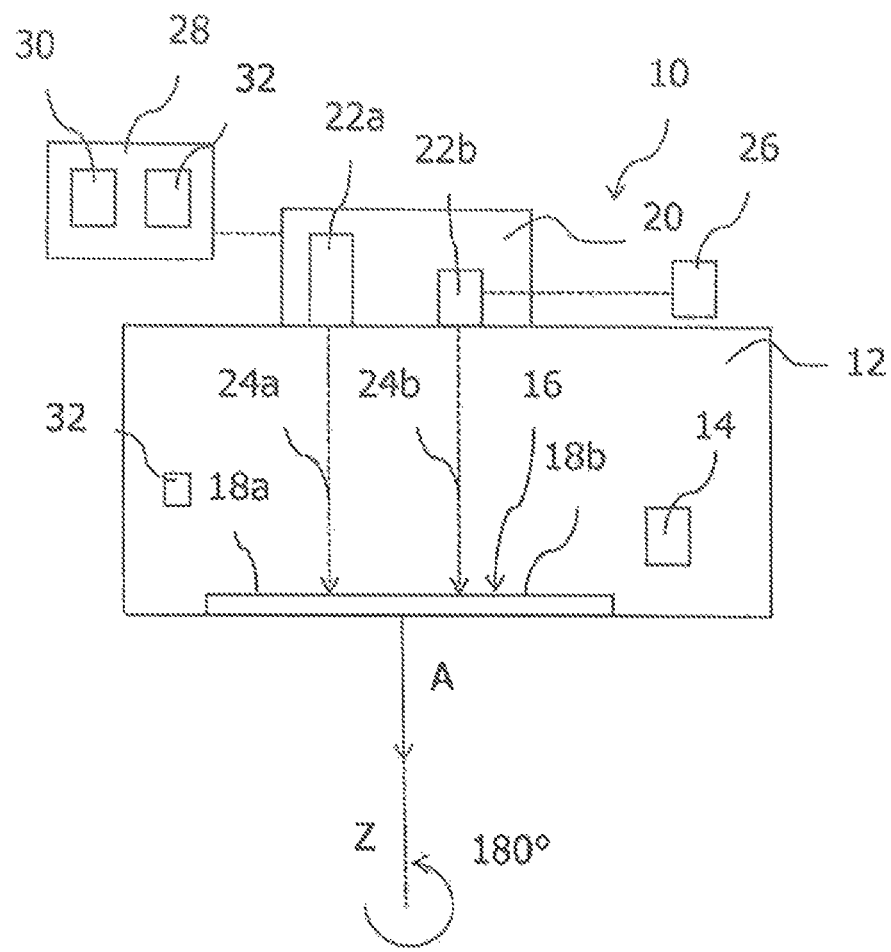

(51) Int. Cl.

| | | |
|---|---|---|
| *B29C 67/00* | (2006.01) | |
| *B23K 26/342* | (2014.01) | |
| *B23K 15/00* | (2006.01) | |
| *B23K 26/34* | (2014.01) | |
| *B33Y 30/00* | (2015.01) | |
| *B23K 15/02* | (2006.01) | |
| *B23K 15/10* | (2006.01) | |
| *B23K 26/70* | (2014.01) | |
| *B23K 26/144* | (2014.01) | |
| *B23K 26/60* | (2014.01) | |
| *B33Y 10/00* | (2015.01) | |

(52) U.S. Cl.
CPC .......... *B23K 15/0086* (2013.01); *B23K 15/02* (2013.01); *B23K 15/10* (2013.01); *B23K 26/144* (2015.10); *B23K 26/34* (2013.01); *B23K 26/60* (2015.10); *B23K 26/702* (2015.10); *B29C 67/0077* (2013.01); *B33Y 30/00* (2014.12); *B22F 2003/1057* (2013.01); *B33Y 10/00* (2014.12); *Y02P 10/295* (2015.11)

(58) Field of Classification Search
USPC ....... 419/31, 53; 219/121.63, 121.64, 121.76
See application file for complete search history.

(56) References Cited

U.S. PATENT DOCUMENTS

| | | |
|---|---|---|
| 2006/0228248 A1 | 10/2006 | Larsson |
| 2012/0237745 A1 | 9/2012 | Dierkes et al. |
| 2013/0143068 A1* | 6/2013 | Richter .................... B23K 9/04 428/636 |
| 2013/0233846 A1 | 9/2013 | Jakimov |
| 2015/0061195 A1* | 3/2015 | DeFelice ............. B29C 67/0088 264/497 |

FOREIGN PATENT DOCUMENTS

| | | |
|---|---|---|
| EP | 2859973 | 4/2015 |
| EP | 2862651 | 4/2015 |
| WO | 2013/092994 A1 | 6/2013 |

* cited by examiner

METHOD AND DEVICE FOR CONTROLLING AN IRRADIATION SYSTEM

The present invention relates to a method and a device for controlling an irradiation system for use in an apparatus for producing a three-dimensional work piece by irradiating layers of a raw material powder with electromagnetic or particle radiation. Furthermore, the invention relates to an apparatus for producing a three-dimensional work piece by irradiating layers of a raw material powder with electromagnetic or particle radiation which is equipped with a device of this kind.

Selective laser melting or laser sintering is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

An apparatus for producing moulded bodies from pulverulent raw materials by selective laser melting is described, for example, in EP 1 793 979 B1. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder to be irradiated with a laser beam onto the carriers. Heating means may be provided for heating the powder to be processed by selective laser melting.

Non-published European patent application No. 13 188 055 describes a powder processing arrangement for use in an apparatus for producing three-dimensional work pieces by selectively irradiating a raw material powder with electromagnetic or particle radiation, wherein a carrier element comprises a build section adapted to carry a raw material powder layer while being selectively irradiated with electromagnetic or particle radiation and at least one transfer section adapted to carry a raw material powder layer prior to being selectively irradiated with electromagnetic or particle radiation. A heating device is adapted to pre-heat the raw material powder carried by the transfer section of the carrier element prior to being applied to the build section of the carrier element so as to form the raw material powder layer to be selectively irradiated with electromagnetic or particle radiation.

Further, as discussed in non-published European patent application No. 13 188 704, in order to produce a large three-dimensional work piece, the raw material powder may be irradiated with electromagnetic or particle radiation by means of an irradiation system comprising a plurality of irradiation units, wherein each irradiation unit may be associated with an irradiation area defined on a surface of a carrier onto which the raw material powder to be irradiated is applied. Each irradiation unit of the irradiation system is controlled such that the raw material powder applied onto the irradiation area associated with the irradiation unit is irradiated in a site selective manner and independent of the irradiation of other irradiation areas not associated with the irradiation unit in question. Hence, each irradiation area defined on the carrier may be individually and independently irradiated.

The invention is directed at the object of providing a method and a device, which allow an irradiation system for use in an apparatus for producing a three-dimensional work piece by irradiating layers of a raw material powder with electromagnetic or particle radiation and comprising a plurality of irradiation units to be controlled in such a manner that a high-quality three-dimensional work piece can be produced. Furthermore, the invention is directed at the object of providing an apparatus for producing a three-dimensional work piece by irradiating layers of a raw material powder with electromagnetic or particle radiation which is equipped with an irradiation system comprising a plurality of irradiation units and which allows the production of a high-quality three-dimensional work piece.

This object is addressed by a method as defined in claim 1, a device as defined in claim 8 and an apparatus as defined in claim 15.

In a method for controlling an irradiation system for use in an apparatus for producing a three-dimensional work piece and comprising a plurality of irradiation units, a first irradiation area is defined on a surface of a carrier adapted to receive a layer of raw material powder. The carrier may be disposed in a process chamber of the apparatus for producing a three-dimensional work piece and may be a rigidly fixed carrier. Preferably, however, the carrier is designed to be displaceable in vertical direction so that, with increasing construction height of a work piece, as it is built up in layers from the raw material powder, the carrier can be moved downwards in the vertical direction. The process chamber may be sealable against the ambient atmosphere, i.e. against the environment surrounding the process chamber, in order to be able to maintain a controlled atmosphere, in particular an inert atmosphere within the process chamber. The raw material powder to be received on the carrier preferably is a metallic powder, in particular a metal alloy powder, but may also be a ceramic powder or a powder containing different materials. The powder may have any suitable particle size or particle size distribution. It is, however, preferable to process powders of particle sizes <100 µm.

The irradiation system to be controlled preferably serves to selectively irradiate the raw material powder applied onto the carrier with electromagnetic or particle radiation. In particular, the raw material powder applied onto the carrier may be subjected to electromagnetic or particle radiation in a site-selective manner in dependence on the desired geometry of the work piece that is to be produced. The irradiation system preferably is adapted to irradiate radiation onto the raw material powder which causes a site-selective melting of the raw material powder particles.

A layer of raw material powder applied onto the carrier in the first irradiation area is irradiated by the first irradiation unit of the irradiation system, wherein the operation of the first irradiation unit is controlled in such a manner that the raw material powder is pre-heated. Thereafter, the layer of raw material powder applied onto the carrier in the first irradiation area is irradiated by means of the second irradiation unit of the irradiation system, wherein the operation of the second irradiation unit is controlled in such a manner that the raw material powder is heated to a temperature which allows sintering and/or melting of the raw material powder in order to generate a layer of the three-dimensional work piece.

For example, the raw material powder, upon being irradiated by the first irradiation unit of the irradiation system, may be pre-heated to a temperature below its sintering and/or melting temperature. It is, however, also conceivable that the raw material powder, upon being irradiated by the first irradiation unit of the irradiation system, already is partially or entirely melted. However, even if the raw material powder, upon being irradiated by the first irradiation unit of the irradiation system, is melted, the first and the second irradiation unit still are controlled in such a manner that the first irradiation unit merely serves to pre-heat the raw material powder, whereas the finally shape-giving sintering and/or melting of the raw material powder occurs while the raw material powder is irradiated by the second irradiation unit.

In the method for controlling an irradiation system, the raw material powder may be very precisely and uniformly pre-heated before actually being sintered in order to generate a layer of the three-dimensional work piece. In particular, the pre-heating can be effected independent from the increase in the amount of raw material powder and in particular the increase in the height of the "stack" of raw material powder layers present on the carrier with increasing construction height of the work piece, as it is built up in layers from the raw material powder. Temperature gradients resulting from the difference between the temperature of raw material powder particles that are actually irradiated with electromagnetic or particle radiation and the temperature of raw material powder particles arranged outside of the irradiation zone as well as the temperature of already generated layers of the work piece thus can be minimized allowing thermal stresses within the work piece to be also minimized. Consequently, a crack-free high-strength and high-quality work piece can be obtained.

Preferably, the operation of the first and/or the second irradiation unit is controlled by appropriately controlling an output power, a radiation beam size, a radiation pattern according to which a radiation beam is guided over the raw material powder applied onto the carrier and/or a scan speed at which a radiation beam is guided over the raw material powder applied onto the carrier for the first and/or the second irradiation unit. For example, the output power of the first irradiation unit may be controlled so as to differ from, in particular so as to be lower than the output power of the second irradiation unit. Furthermore, the size of a radiation beam emitted by the first irradiation unit may be controlled so as to differ from, in particular so as to be larger than the size of a radiation beam emitted by the second irradiation unit. Moreover, the scan speed at which a radiation beam emitted by the first irradiation unit is guided over the raw material powder applied onto the carrier may be controlled so as to differ from the scan speed at which a radiation beam emitted by the second irradiation unit is guided over the raw material powder applied onto the carrier. In dependence on the type of the raw material powder and the desired processing of the raw material powder, the scan speed of the radiation beam emitted by the first irradiation unit may be lower or higher than the scan speed of the radiation beam emitted by the second irradiation unit.

The radiation pattern according to which the radiation beams emitted by the first and the second irradiation unit are guided over the raw material powder applied onto the carrier may be any suitable radiation pattern, for example a chessboard pattern, a stripe pattern or a pattern comprising arbitrarily shaped sections, wherein the individual sections of the radiation pattern may be defined by a plurality of scan vectors. A radiation beam emitted by the first irradiation unit may be guided over the raw material powder applied onto the carrier according to a radiation pattern which differs from the radiation pattern according to which a radiation beam emitted by the second irradiation unit is guided over the raw material powder applied onto the carrier. For example, the radiation beam emitted by the first irradiation unit may follow a stripe pattern, whereas the radiation beam emitted by the second irradiation unit may follow a chessboard pattern. It is, however, also conceivable that the radiation patterns according to which the radiation beams emitted by the first and the second irradiation unit are guided over the raw material powder applied onto the carrier are of the same type, but differ in their hatch distances, i.e. the distances between adjacent hatches of the radiation pattern.

Moreover, the operation of the first and/or the second irradiation unit may be controlled by selecting an output radiation wavelength for the first and/or the second irradiation unit. Basically, the first and the second irradiation unit may be associated with a single radiation beam source. A radiation beam provided by a single radiation beam source, by suitable means such as, for example, beam splitters and/or mirrors, may be split and/or deflected as required so as to direct the radiation beam provided by the single radiation beam source to the associated irradiation units. It is, however, also conceivable that each irradiation unit comprises a radiation beam source having an appropriately selected output radiation wavelength. Preferably, the first and the second irradiation unit are equipped with radiation beam sources having different output radiation wavelengths.

In a preferred embodiment of the method for controlling an irradiation system, the first irradiation unit emits an electron beam. In order to direct the electron beam across the raw material powder applied onto the carrier, the first irradiation unit may comprise deflection means or other suitable means for guiding, deflecting and controlling an electron beam. Preferably, the electron beam is guided across the raw material power applied onto the carrier in a defocused manner. An electrode beam is particularly suitable in order to rapidly preheat metallic raw material powders to a temperature of approximately 400 to 600° C. As a result, materials that are difficult to weld can be prepared so as to be sintered and/or melted upon being irradiated by means of the second irradiation unit.

Furthermore, independent of whether the first irradiation unit emits an electron beam or another radiation beam, the first irradiation unit may emit a plurality of radiation beams. In particular, the first irradiation unit may emit an array of radiation beams which may be guided across the raw material powder in order to very effectively and uniformly preheat the raw material powder. A quantum cascade laser is particularly suitable for use as a radiation beam source for a first irradiation unit emitting a plurality of radiation beams.

The second irradiation unit may emit a laser beam. In particular, a radiation beam source associated with the second irradiation unit may comprise a diode pumped Ytterbium fibre laser emitting laser light at a wavelength of approximately 1070 to 1080 nm. Further, the second irradiation unit may comprise at least one optical unit for guiding and/or processing the radiation beam emitted by the radiation beam source and supplied to the second irradiation unit. The optical unit may comprise optical elements such as an object lens, in particular an f-theta lens, and a scanner unit, the scanner unit preferably comprising a diffractive optical element and a deflection mirror.

Preferably, the operation of the first and/or the second irradiation unit is controlled in dependence on temperature signals indicative of the temperature of the raw material powder during being irradiated by the first and/or the second irradiation unit. By measuring the temperature of the raw material powder upon being irradiated by either the first or the second irradiation unit, the pre-heating as well as the sintering and/or melting of the raw material powder can be controlled in a reliable manner. The temperature signals which are used for controlling the operation of the first and/or the second irradiation unit preferable are provided by a pyrometer and/or a thermal imaging camera.

In a preferred embodiment of the method for controlling an irradiation system, a second irradiation area may be defined on the surface of the carrier. A layer of raw material powder applied onto the carrier in the second irradiation area may be irradiated by the second irradiation unit of the irradiation system, while the first irradiation unit irradiates a layer of raw material powder applied onto the carrier in the first irradiation area. Alternatively or additionally thereto, a layer of raw material powder applied onto the carrier in the first irradiation area may be irradiated by the second irradiation unit of the irradiation system, while the first irradiation unit irradiates a layer of raw material powder applied onto the carrier in the second irradiation area. As a result, the first and the second irradiation area can simultaneously be irradiated, thus accelerating the generation of the three-dimensional work piece.

In particular in case a first and a second irradiation area defined on the surface of the carrier should simultaneously be irradiated by the first and the second irradiation unit, the irradiation system, the first irradiation unit and/or the second irradiation unit may be moved relative to the carrier in order to allow the first and/or the second irradiation area to be irradiated by the first and the second irradiation unit in a successive manner. In other words, either the entire irradiation system or the first and the second irradiation unit in a separate manner may be moved relative to the carrier in order to arrange the first and the second irradiation unit in a position such that the first and/or the second irradiation area defined on the surface of the carrier can successively be irradiated by the first irradiation unit and thereafter the second irradiation unit.

Alternatively or additionally thereto, the carrier and/or a process chamber accommodating the carrier may be moved relative to the irradiation system, the first irradiation unit and/or the second irradiation unit in order to allow the first and/or the second irradiation area defined on the surface of the carrier to be irradiated by the first and the second irradiation unit in a successive manner. In other words, it is also possible to move the carrier and/or the entire process chamber accommodating the carrier relative to the irradiation system, in particular the first and the second irradiation unit, in order to arrange the carrier in a position such that the first and/or the second irradiation unit can be successively irradiated by first the first irradiation unit and thereafter the second irradiation unit.

In particular, the irradiation system, the first irradiation unit and/or the second irradiation unit may be rotated relative to the carrier about 180°, in order to allow the first and/or the second irradiation area to be irradiated by the first and the second irradiation unit in a successive manner. Alternatively or additionally thereto, the carrier and/or the process chamber accommodating the carrier may be rotated relative to the irradiation system, the first irradiation unit and/or the second irradiation unit about 180°, in order to allow the first and/or the second irradiation area to be irradiated by the first and the second irradiation unit in a successive manner. By rotating the irradiation system or parts thereof and the carrier or a process chamber accommodating the carrier relative to each other about 180°, a carrier, the surface of which is divided into a first and a second irradiation area arranged side-by-side, can be irradiated as desired.

In the irradiation system, the first and the second irradiation unit may be adapted to irradiate only one of the irradiation areas defined on the surface of the carrier. In other words, in dependence on the relative position of the irradiation system and the carrier, the first and the second irradiation unit may be adapted to irradiate only the first or only the second irradiation area. It is, however, also conceivable to define an overlap area on the surface of the carrier which may be irradiated by the first and the second irradiation unit, independent of the relative position of the irradiation system and the carrier. If desired, the entire surface of the carrier may be defined as an overlap area which may be irradiated by the first and the second irradiation unit. A change of the relative position of the irradiation system and the carrier in order to allow the irradiation areas defined on the surface of the carrier to be irradiated by the irradiation units of the irradiation system in a successive manner then can be dispensed with. As a result, the process can be simplified and a three-dimensional work piece can be generated more quickly.

Furthermore, the irradiation system may comprise more than two irradiation units, for example four irradiation units. In case overlap areas are defined on the surface of the carrier, more than one irradiation unit, for example two or four irradiation units, may be operated so as to simultaneously irradiate raw material powder applied onto an overlap area defined on the surface of the carrier. In this case, operation of the irradiation units, however, should be controlled in such a manner that undesired interferences between the irradiation beams emitted by the irradiation units are avoided.

A device for controlling an irradiation system for use in an apparatus for producing a three-dimensional workpiece and comprising a first and a second irradiation unit comprises a definition unit adapted to define a first irradiation area on a surface of the carrier adapted to receive a layer of raw material powder. The apparatus further comprises a control unit which is adapted to control the operation of the first irradiation unit in such a manner that a layer of raw material powder applied onto the carrier in the first irradiation area is irradiated by the first irradiation unit so as to preheat the raw material powder. Furthermore, the control unit is adapted to control the operation of the second irradiation unit in such a manner that the layer of raw material powder applied onto the carrier in the first irradiation area thereafter is irradiated by the second irradiation unit so as to heat the raw material powder to a temperature which allows sintering and/or melting of the raw material powder in order to generate a layer of the three-dimensional work piece.

Preferably, the control unit is adapted to control the operation of the first and/or the second irradiation unit by appropriately controlling an output power, a radiation beam size, a radiation pattern according to which a radiation beam is guided over the raw material powder applied onto the carrier and/or a scan speed at which a radiation beam is guided over the raw material powder applied onto the carrier for the first and/or the second irradiation unit. Alternatively or additionally thereto, an output radiation wavelength may be appropriately selected for the first and/or the second irradiation unit, for example by appropriately selecting a radiation beam source associated with the first and/or the second irradiation unit, so as to control the operation of the first and/or the second irradiation unit.

Preferably, the first irradiation unit is adapted to emit an electrode beam. Alternatively or additionally thereto, the first irradiation unit may be adapted to emit a plurality of radiation beams, in particular an array of radiation beams. The second irradiation unit may be adapted to emit a laser beam.

The control unit may be adapted to control the operation of the first and/or the second irradiation unit in dependence on temperature signals indicative of the temperature of the raw material powder during being irradiated by the first and/or the second irradiation unit, the temperature signals in particular being provided by a pyrometer and/or a thermal imaging camera.

The definition unit may further be adapted to define a second irradiation area on the surface of the carrier. Furthermore, the control unit may be adapted to control the operation of the first and/or the second irradiation unit in such a manner that a layer of raw material powder applied onto the carrier in the second irradiation area is irradiated by the second irradiation unit of the irradiation system, while the first irradiation unit irradiates a layer of raw material powder applied onto the carrier in the first irradiation area. Alternatively or additionally thereto, the control unit may be adapted to control the operation of the first and/or the second irradiation unit in such a manner that a layer of raw material powder applied onto the carrier in the first irradiation area is irradiated by the second irradiation unit of the irradiation system, while the first irradiation unit irradiates a layer of raw material powder applied onto the carrier in the second irradiation area.

The irradiation system, the first irradiation unit and/or the second irradiation unit may be movable relative to the carrier in order to allow the first and/or the second irradiation area to be irradiated by the first and the second irradiation unit in a successive manner. Alternatively or additionally thereto, the carrier and/or a process chamber accommodating the carrier may be movable relative to the irradiation system, the first irradiation unit and/or the second irradiation unit in order to allow the first and/or the second irradiation area to be irradiated by the first and the second irradiation unit in a successive manner.

In particular, the irradiation system, the first irradiation unit and/or the second irradiation unit may be rotatable relative to the carrier about 180°, in order to allow the first and/or the second irradiation area to be irradiated by the first and the second irradiation unit in a successive manner. Alternatively or additionally thereto, the carrier and/or the process chamber accommodating the carrier may be rotatable relative to the irradiation system, the first irradiation unit and/or the second irradiation unit about 180°, in order to allow the first and/or the second irradiation area to be irradiate by the first and the second irradiation unit in a successive manner.

An apparatus for producing a three-dimensional workpiece comprises an irradiation system comprising a first and a second irradiation unit. Further, the apparatus comprises the above-described device for controlling the irradiation system.

Figure 2:
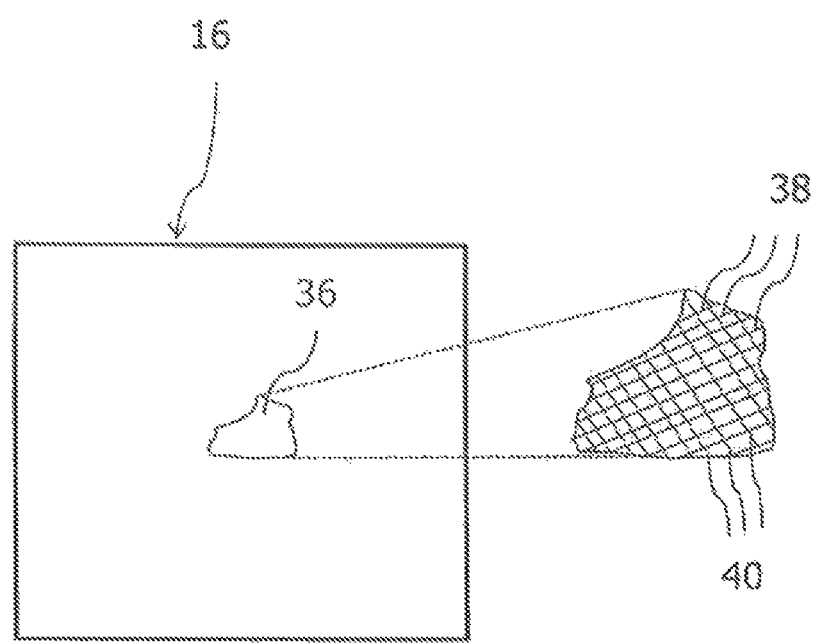

Preferred embodiments of the invention in the following are explained in greater detail with reference to the accompanying schematic drawings, in which:

FIG. 1 shows a schematic representation of an apparatus for producing three-dimensional work pieces, FIG. 2 shows a top view of a carrier of the apparatus depicted in FIG. 1.

FIG. 1 shows an apparatus 10 for producing three-dimensional work pieces by selective laser melting (SLM®). The apparatus 10 comprises a process chamber 12. The process chamber 12 is scalable against the ambient atmosphere, i.e. against the environment surrounding the process chamber 12. A powder application device 14, which is disposed in the process chamber 12, serves to apply a raw material powder onto a carrier 16. As indicated by an arrow A in FIG. 1, the carrier 16 is designed to be displaceable in a vertical direction so that, with increasing construction height of a work piece, as it is built up in layers from the raw material powder on the carrier 16, the carrier 16 can be moved downwards in the vertical direction. A first and a second irradiation area 18a, 18b are defined on a surface of the carrier 16 in a side-by-side arrangement, i.e. in the apparatus 10 depicted in FIG. 1, a left half of the carrier surface defines the first irradiation area 18a, while a right half of the carrier surface defines the second irradiation are 18b.

The apparatus 10 further comprises an irradiation system 20 for selectively irradiating the raw material powder applied onto the carrier 16. By means of the irradiation system 20, the raw material powder applied onto the carrier 16 may be subjected to laser radiation in a site-selective manner in dependence on the desired geometry of the work piece that is to be produced. The irradiation system 20 comprises a first and a second irradiation unit 22a, 22b. The first irradiation unit 22a is adapted to irradiate the first irradiation area 18a defined on the surface of the carrier 16 and comprises an electron beam tube which emits an electron beam 24a. Hence, by means of the first irradiation unit 22a, the raw material powder applied onto the first irradiation area 18a may be irradiated with a radiation beam configured as an electron beam 24a.

The second irradiation unit 22b is adapted to irradiate the second irradiation area 18b defined on the surface of the carrier 16 and is associated with a laser beam source 26, for example a diode pumped Ytterbium fibre laser emitting laser light at a wavelength of approximately 1070 to 1080 nm. The second irradiation unit 22b may comprise an optical unit for guiding and/or processing the radiation beam emitted by the laser beam source 26 and supplied to the second irradiation unit 22b. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens. Hence, by means of the second irradiation unit 22b, the raw material powder applied onto the second irradiation area 18b may be irradiated with a radiation beam configured as a laser beam 24b.

The operation of the irradiation system 20 is controlled by means of a control device 28. The control device 28 comprises a definition unit 30 which serves to define the first and the second irradiation area 18a, 18b on the surface of the carrier 16. A control unit 32 of the control device 28 is adapted to control the operation of the first and the second irradiation unit 22a, 22b. Under the control of the control unit 32, the first irradiation unit 22a of the irradiation system 20 is operated so as to irradiate an electron beam 24a onto a layer of raw material powder applied onto the carrier 16 in the first irradiation area 18a such that the raw material powder is pre-heated. For example, the raw material powder, upon being irradiated by the first irradiation unit 22a, may be pre-heated by to a temperature below its sintering and/or melting temperature. In particular, the electron beam 24a emitted by the first irradiation unit 22a may be used to very quickly pre-heat a metallic raw material powder which is difficult to weld to a temperature of 500 to 600° C. It is, however, also conceivable that the raw material powder, upon being irradiated by the first irradiation unit 22a, already is partially or entirely melted.

Operating parameters of the first irradiation unit 22a which may be controlled by the control unit 32 in order to achieve the desired pre-heating of the raw material powder applied onto the carrier 16 in the first irradiation area 18a include an output power of the first irradiation unit 22a, a size of the electron beam 24a emitted by the first irradiation unit 22a—preferably the electron beam 24a is defocused—, a radiation pattern according to which the electron beam 24a is guided over the raw material powder and a scan speed at which the electron beam 24a is guided over the raw material. The operating parameters of the first irradiation unit 22a are controlled by the control unit 32 in dependence on temperature signals indicative of the temperature of the raw material powder during being irradiated by the first irradiation unit 22a. These temperature signals are provided by a suitable temperature sensing device 34 such as, for example, a pyrometer and/or a thermal imaging camera.

After completion of the pre-heating step, operation of the first irradiation unit 22a is interrupted and the process chamber 12 accommodating the carrier 16 is rotated relative to the irradiation system 20 around an axis Z about an angle of 180°. As a result, the first irradiation area 18a defined on the surface of the carrier 16 is brought into a position at which the first irradiation area 18a may be irradiated by the laser beam 24b emitted by the second irradiation unit 22b. As an alternative, it is also conceivable to rotate the irradiation system 20 relative to the carrier 16 in order to arrange the first irradiation area 18a at a position at which it may be irradiated by the laser beam 24b emitted by the second irradiation unit 22b. As a further alternative, the first and the second irradiation unit 22a, 22b may be designed and positioned relative to the carrier 16 in such a manner that they are capable to irradiate the entire surface of the carrier 16. A relative movement of the radiation system 20 and the carrier 16 then may be omitted.

Under the control of the control unit 32, the second irradiation unit 22b of the irradiation system 20 then is operated so as to irradiate a laser beam 24b onto the pre-heated layer of raw material powder applied onto the carrier 16 in the first irradiation area 18a. In particular, the operation of the second irradiation unit 22b is controlled in such a manner that the pre-heated raw material powder finally is heated to a temperature which allows sintering and/or melting of the raw material powder in order to generate a layer of a three-dimensional work piece. Thus, the layer-forming sintering step occurs while the raw material powder is irradiated by the second irradiation unit 22b.

Again, operating parameters of the second irradiation unit 22b which may be controlled by the control unit 32 in order to achieve the desired final sintering and/or melting of the raw material powder applied onto the carrier 16 in the first irradiation area 18a include an output power of the second irradiation unit 22b, a size of the laser beam 24b emitted by the second irradiation unit 22b, a radiation pattern according to which the laser beam 24b is guided over the raw material powder and a scan speed at which the laser beam 24b is guided over the raw material. Furthermore, similar as upon irradiating the raw material powder by means of the first irradiation unit 22a, also the operating parameters of the second irradiation unit 22b are controlled by the control unit 32 in dependence on temperature signals which are indicative of the temperature of the raw material powder during being irradiated by the second irradiation unit 22b and which are provided by the temperature sensing device 34.

Furthermore, while the second irradiation unit 22b irradiates the raw material powder applied onto the carrier 16 in the first irradiation area 18a, the first irradiation unit 22a is operated so as to irradiate and thus pre-heat the raw material powder applied onto the carrier 16 in the second irradiation area 18b. After completion of the pre-heating of the raw material powder in the second irradiation area 18b and after completion of the sintering and/or melting of the raw material powder in the first irradiation area 18a, the process chamber 12 again is rotated around the axis Z about an angle of 180° and the second irradiation unit 22a can immediately start irradiating the raw material powder in the second irradiation area 18b. After completion of the sintering and/or melting of the raw material powder in the second irradiation area 18b, a new raw material powder layer is applied onto the carrier 16 by means of the powder application device and the process steps described above are repeated.

As described above, the raw material powder layer applied onto the carrier 16 may be pre-heated across a large area of the carrier 16, for example by means of a first irradiation unit 22a which is configured to emit an electron beam 24a. As shown in FIG. 2, it is, however, also conceivable to use an irradiation unit which is configured to emit a laser beam as the first irradiation unit 22a. The laser beam emitted by the first irradiation unit 22a then may be used to pre-heat a selected area 36 of the powder layer applied onto the carrier 16 using a desired radiation pattern 38. After completion of the pre-heating, the second irradiation unit 22b may be guided across the selected area 36 of the raw material powder layer according to a radiation pattern 40. In particular, the radiation patterns 38, 40 according to which the radiation beams emitted by the first and the second irradiation unit 22a, 22b are guided across the raw material powder layer may be rotated relative to each other about an angle of 90°. The first and the second irradiation unit 22a, 22b may be operated in a successive manner or simultaneously. However, operation of the irradiation units 22a, 22b, in any case, should be controlled in such a manner that undesired interferences between the irradiation beams emitted by the irradiation units 22a, 22b are avoided.

The invention claimed is:

1. Method for controlling an irradiation system for use in an apparatus for producing a three-dimensional work piece and comprising a first and a second irradiation unit, the method comprising the steps of:
    defining a first irradiation area on a surface of a carrier adapted to receive a layer of raw material powder,
    irradiating a layer of raw material powder applied onto the carrier in the first irradiation area by the first irradiation unit of the irradiation system, wherein the operation of the first irradiation unit is controlled in such a manner that the raw material powder is pre-heated, and
    thereafter irradiating the layer of raw material powder applied onto the carrier in the first irradiation area by means of the second irradiation unit of the irradiation system, wherein the operation of the second irradiation unit is controlled in such a manner that the raw material powder is heated to a temperature which allows sintering and/or melting of the raw material powder in order to generate a layer of the three-dimensional work piece.

2. The method according to claim 1, wherein the operation of the first and/or the second irradiation unit is controlled by appropriately controlling an output power, a radiation beam size, a radiation pattern according to which a radiation beam is guided over the raw material powder applied onto the carrier and/or a scan speed at which a radiation beam is guided over the raw material powder applied onto the carrier for the first and/or the second irradiation unit and/or by selecting an output radiation wavelength for the first and/or the second irradiation unit.

3. The method according to claim 1, wherein the first irradiation unit emits an electron beam and/or a plurality of radiation beams, and/or wherein the second irradiation unit emits a laser beam.

4. The method according to claim 1, wherein the operation of the first and/or the second irradiation unit is controlled in dependence on temperature signals indicative of the temperature of the raw material powder during being irradiated by first and/or the second irradiation unit, the temperature signals in particular being provided by a pyrometer and/or a thermal imaging camera.

5. The method according to claim 1, further comprising the steps of:
defining a second irradiation area on the surface of the carrier, and
irradiating a layer of raw material powder applied onto the carrier in the second irradiation area by the second irradiation unit of the irradiation system, while the first irradiation unit irradiates a layer of raw material powder applied onto the carrier in the first irradiation area, and/or
irradiating a layer of raw material powder applied onto the carrier in the first irradiation area by the second irradiation unit of the irradiation system, while the first irradiation unit irradiates a layer of raw material powder applied onto the carrier in the second irradiation area.

6. The method according to claim 1, wherein the irradiation system, the first irradiation unit and/or the second irradiation unit is/are moved relative to the carrier in order to allow the first and/or the second irradiation area to be irradiated by the first and the second irradiation unit in a successive manner, and/or wherein the carrier and/or a process chamber accommodating the carrier is/are moved relative to the irradiation system, the first irradiation unit and/or the second irradiation unit in order to allow the first and/or the second irradiation area to be irradiated by the first and the second irradiation unit in a successive manner.

7. The method according to claim 6, wherein the irradiation system, the first irradiation unit and/or the second irradiation unit is/are rotated relative to the carrier about 180°, and/or wherein the carrier and/or the process chamber accommodating the carrier is/are rotated relative to the irradiation system, the first irradiation unit and/or the second irradiation unit about 180°, in order to allow the first and/or the second irradiation area to be irradiated by the first and the second irradiation unit in a successive manner.

8. Device for controlling an irradiation system for use in an apparatus for producing a three-dimensional work piece and comprising a first and a second irradiation unit, the device comprising:
a definition unit adapted to define a first irradiation area on a surface of a carrier adapted to receive a layer of raw material powder, and
a control unit which is adapted to control the operation of the first irradiation unit in such a manner that a layer of raw material powder applied onto the carrier in the first irradiation area is irradiated by the first irradiation unit so as to pre-heat the raw material powder, and which further is adapted to control the operation of the second irradiation unit in such a manner that the layer of raw material powder applied onto the carrier in the first irradiation area thereafter is irradiated by the second irradiation unit so as to heat the raw material powder to a temperature which allows sintering and/or melting of the raw material powder in order to generate a layer of the three-dimensional work piece.

9. The device according to claim 8, wherein the control unit is adapted to control the operation of the first and/or the second irradiation unit by appropriately controlling an output power, a radiation beam size, a radiation pattern according to which a radiation beam is guided over the raw material powder applied onto the carrier and/or a scan speed at which a radiation beam is guided over the raw material powder applied onto the carrier for the first and/or the second irradiation unit and/or wherein the an output radiation wavelength is appropriately selected for the first and/or the second irradiation unit so as to control the operation of the first and/or the second irradiation unit.

10. The device according to claim 8, wherein the first irradiation unit is adapted to emit an electron beam and/or a plurality of radiation beams, and/or wherein the second irradiation unit is adapted to emit a laser beam.

11. The device according to claim 8, wherein the control unit is adapted to control the operation of the first and/or the second irradiation unit in dependence on temperature signals indicative of the temperature of the raw material powder during being irradiated by the first and/or the second irradiation unit, the temperature signals in particular being provided by a pyrometer and/or a thermal imaging camera.

12. The device according to claim 8, wherein the definition unit is adapted to define a second irradiation area on the surface of the carrier, and wherein the control unit is adapted to control the operation of the first and/or the second irradiation unit in such a manner that a layer of raw material powder applied onto the carrier in the second irradiation area is irradiated by the second irradiation unit of the irradiation system, while the first irradiation unit irradiates a layer of raw material powder applied onto the carrier in the first irradiation area, and/or wherein the control unit is adapted to control the operation of the first and/or the second irradiation unit in such a manner that a layer of raw material powder applied onto the carrier in the first irradiation area is irradiated by the second irradiation unit of the irradiation system, while the first irradiation unit irradiates a layer of raw material powder applied onto the carrier in the second irradiation area.

13. The device according to claim 8, wherein the irradiation system, the first irradiation unit and/or the second irradiation unit is/are movable relative to the carrier in order to allow the first and/or the second irradiation area to be irradiated by the first and the second irradiation unit in a successive manner, and/or wherein the carrier and/or a process chamber accommodating the carrier is/are movable relative to the irradiation system, the first irradiation unit and/or the second irradiation unit in order to allow the first and/or the second irradiation area to be irradiated by the first and the second irradiation unit in a successive manner.

14. The device according to claim 13,
wherein the irradiation system, the first irradiation unit and/or the second irradiation unit is/are rotatable relative to the carrier about 180°, and or wherein the carrier and/or the process chamber accommodating the carrier is/are rotatable relative to the irradiation system, the first irradiation unit and/or the second irradiation unit about 180°, in order to allow the first and/or the second irradiation area to be irradiated by the first and the second irradiation unit in a successive manner.

15. Apparatus for producing a three-dimensional work piece, comprising:
an irradiation system comprising a first and a second irradiation unit and
a device for controlling the irradiation system according to claim 8.

* * * * *